(12) United States Patent
Jafarian et al.

(10) Patent No.: US 9,451,654 B2
(45) Date of Patent: Sep. 20, 2016

(54) SYSTEMS AND METHODS FOR MULTI-HOP RELAY SELECTION

(71) Applicant: Qualcomm Incorporated, San Diego, CA (US)

(72) Inventors: Amin Jafarian, San Diego, CA (US); George Cherian, San Diego, CA (US); Santosh Paul Abraham, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 13/749,620

(22) Filed: Jan. 24, 2013

(65) Prior Publication Data

US 2014/0056210 A1 Feb. 27, 2014

Related U.S. Application Data

(60) Provisional application No. 61/693,470, filed on Aug. 27, 2012.

(51) Int. Cl.
*H04J 1/10* (2006.01)
*H04W 88/04* (2009.01)
*H04B 7/155* (2006.01)
*H04W 40/22* (2009.01)
*H04L 12/721* (2013.01)
*H04B 7/26* (2006.01)

(52) U.S. Cl.
CPC ............. *H04W 88/04* (2013.01); *H04B 7/155* (2013.01); *H04L 45/12* (2013.01); *H04W 40/22* (2013.01); *H04B 7/2606* (2013.01)

(58) Field of Classification Search
None
See application file for complete search history.

(56) References Cited

U.S. PATENT DOCUMENTS

| | | | |
|---|---|---|---|
| 7,464,166 B2 | 12/2008 | Larsson et al. | |
| 7,613,165 B2 | 11/2009 | Shin et al. | |
| 2002/0085503 A1* | 7/2002 | Hulyalkar et al. | ............ 370/252 |
| 2006/0199530 A1 | 9/2006 | Kawasaki | |
| 2007/0101015 A1 | 5/2007 | Larsson et al. | |
| 2007/0127421 A1 | 6/2007 | D'Amico et al. | |
| 2008/0084856 A1 | 4/2008 | Ramachandran | |
| 2009/0190531 A1 | 7/2009 | Jetcheva et al. | |

(Continued)

FOREIGN PATENT DOCUMENTS

| | | |
|---|---|---|
| GB | 2475851 A | 6/2011 |
| WO | 2011153507 A2 | 12/2011 |

OTHER PUBLICATIONS

International Search Report and Written Opinion—PCT/US2013/053477—ISA/EPO—Feb. 19, 2014.

(Continued)

*Primary Examiner* — Willie J Daniel, Jr.
(74) *Attorney, Agent, or Firm* — Eric Ho

(57) ABSTRACT

Systems, methods, and devices for communicating data in a wireless communications network are described herein. In some aspects, a relay is configured to receive at least one first parameter advertised by a first potential parent relay and at least one second parameter advertised by a second potential parent relay. The relay may be further configured to select the first potential parent relay or the second potential parent relay to relay one or more packets based on the at least one first parameter advertised by the first potential parent relay and the at least one second parameter advertised by the second potential parent relay.

45 Claims, 7 Drawing Sheets

(56) References Cited

U.S. PATENT DOCUMENTS

| | | |
|---|---|---|
| 2009/0252078 A1 | 10/2009 | Lim et al. |
| 2009/0307484 A1 | 12/2009 | Zhang et al. |
| 2011/0047291 A1 | 2/2011 | Ishii et al. |
| 2011/0134827 A1* | 6/2011 | Hooli et al. ............ 370/315 |
| 2011/0134828 A1 | 6/2011 | Osseiran et al. |
| 2011/0242971 A1 | 10/2011 | Kokado |
| 2013/0083722 A1* | 4/2013 | Bhargava et al. ............ 370/315 |
| 2013/0295921 A1* | 11/2013 | Bhargava et al. ......... 455/426.1 |

OTHER PUBLICATIONS

Partial International Search Report—PCT/US2013/053477—ISA/EPO—Dec. 9, 2013.

* cited by examiner

SYSTEMS AND METHODS FOR MULTI-HOP RELAY SELECTION

CROSS-REFERENCE TO RELATED APPLICATIONS

This application claims priority under 35 U.S.C. §119(e) to U.S. Provisional Patent Application No. 61/693,470, entitled "SYSTEMS AND METHODS FOR MULTI-HOP RELAY SELECTION" and filed on Aug. 27, 2012, the entire contents of which disclosure is herewith incorporated by reference.

BACKGROUND

1. Field

The present application relates generally to wireless communications, and more specifically to systems, methods, and devices for using a relay in a wireless communication network approach.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit information to other devices in the wireless network and/or may receive information from other devices in the wireless network. For example, a station may communicate with an access point to which it is associated. In some aspects, however, the devices in the wireless network may have a poor connection and/or may not be able to communicate with each other. Having a poor connection and/or not being able to communicate with other devices in the wireless network may have adverse consequences. For example, if a station can no longer communicate with an access point to which it is associated, a user of the station may no longer have access to the services (e.g., Internet access) provided by the access point. Thus, improved systems, methods, and devices for communicating in a wireless network are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of this disclosure provides an apparatus for communicating data in a wireless communications network. The apparatus comprises a receiver configured to receive at least one first parameter advertised by a first potential parent relay and at least one second parameter advertised by a second potential parent relay. The at least one first parameter may comprise a first link life parameter. The first link life parameter may comprise an indication of a last time that the first potential parent relay was in contact with an access point. The at least one second parameter may comprise a second link life parameter. The second link life parameter may comprise an indication of a last time that the second potential parent relay was in contact with the access point. The apparatus further comprises a processor coupled to the receiver and configured to select the first potential parent relay or the second potential parent relay to relay two or more packets based on the at least one first parameter advertised by the first potential parent relay and the at least one second parameter advertised by the second potential parent relay.

Another aspect of this disclosure provides a method for communicating data in a wireless communications network. The method comprises receiving, by a relay, at least one first parameter advertised by a first potential parent relay and at least one second parameter advertised by a second potential parent relay. The at least one first parameter may comprise a first link life parameter. The first link life parameter may comprise an indication of a last time that the first potential parent relay was in contact with an access point. The at least one second parameter may comprise a second link life parameter. The second link life parameter may comprise an indication of a last time that the second potential parent relay was in contact with the access point. The method further comprises selecting, by the relay, the first potential parent relay or the second potential parent relay to relay two or more packets based on the at least one first parameter advertised by the first potential parent relay and the at least one second parameter advertised by the second potential parent relay.

Another aspect of this disclosure provides an apparatus for communicating data in a wireless communications network. The apparatus comprises means for receiving at least one first parameter advertised by a first potential parent relay and at least one second parameter advertised by a second potential parent relay. The at least one first parameter may comprise a first link life parameter. The first link life parameter may comprise an indication of a last time that the first potential parent relay was in contact with an access point. The at least one second parameter may comprise a second link life parameter. The second link life parameter may comprise an indication of a last time that the second potential parent relay was in contact with the access point. The apparatus further comprises means for selecting the first potential parent relay or the second potential parent relay to relay two or more packets based on the at least one first parameter advertised by the first potential parent relay and the at least one second parameter advertised by the second potential parent relay.

Another aspect of this disclosure provides a non-transitory computer-readable medium comprising code that, when executed, causes an apparatus to receive at least one first parameter advertised by a first potential parent relay and at least one second parameter advertised by a second potential parent relay. The at least one first parameter may comprise a first link life parameter. The first link life parameter may comprise an indication of a last time that the first potential parent relay was in contact with an access point. The at least one second parameter may comprise a second link life parameter. The second link life parameter may comprise an indication of a last time that the second potential parent relay was in contact with the access point. The medium further comprises code that, when executed, causes an apparatus to select the first potential parent relay or the second potential parent relay to relay two or more packets based on the at least one first parameter advertised by the first potential parent relay and the at least one second parameter advertised by the second potential parent relay.

Another aspect of this disclosure provides a method for communicating data in a wireless communications network. The method comprises receiving, by a relay, at least one first parameter advertised by a first potential parent relay. The at least one first parameter may comprise a first link life parameter. The first link life parameter may comprise an indication of a last time that the first potential parent relay was in contact with an access point. The method further comprises selecting, by the relay, the first potential parent relay to relay one or more packets. The method further comprises receiving, by the relay, at least one second parameter advertised by a second potential parent relay. The at least one second parameter may comprise a second link life parameter. The second link life parameter may comprise an indication of a last time that the second potential parent relay was in contact with the access point. The method further comprises deselecting the first potential parent relay and selecting the second potential parent relay to relay one or more other packets if a cost function associated with the second potential parent relay and computed in response to receiving the at least one second parameter is lower than a cost function associated with the first potential parent relay and computed in response to receiving the at least one first parameter.

Another aspect of this disclosure provides an apparatus for communicating data in a wireless communications network. The apparatus comprises means for receiving at least one first parameter advertised by a first potential parent relay. The at least one first parameter may comprise a first link life parameter. The first link life parameter may comprise an indication of a last time that the first potential parent relay was in contact with an access point. The apparatus further comprises means for selecting the first potential parent relay to relay one or more packets. The apparatus further comprises means for receiving at least one second parameter advertised by a second potential parent relay. The at least one second parameter may comprise a second link life parameter. The second link life parameter may comprise an indication of a last time that the second potential parent relay was in contact with the access point. The apparatus further comprises means for deselecting the first potential parent relay and means for selecting the second potential parent relay to relay one or more other packets if a cost function associated with the second potential parent relay and computed in response to receiving the at least one second parameter is lower than a cost function associated with the first potential parent relay and computed in response to receiving the at least one first parameter.

Another aspect of this disclosure provides a non-transitory computer-readable medium comprising code that, when executed, causes an apparatus to receive at least one first parameter advertised by a first potential parent relay. The at least one first parameter may comprise a first link life parameter. The first link life parameter may comprise an indication of a last time that the first potential parent relay was in contact with an access point. The medium further comprises code that, when executed, causes an apparatus to select the first potential parent relay to relay one or more packets. The medium further comprises code that, when executed, causes an apparatus to receive at least one second parameter advertised by a second potential parent relay. The at least one second parameter may comprise a second link life parameter. The second link life parameter may comprise an indication of a last time that the second potential parent relay was in contact with the access point. The medium further comprises code that, when executed, causes an apparatus to deselect the first potential parent relay and select the second potential parent relay to relay one or more other packets if a cost function associated with the second potential parent relay and computed in response to receiving the at least one second parameter is lower than a cost function associated with the first potential parent relay and computed in response to receiving the at least one first parameter.

Another aspect of this disclosure provides an apparatus for communicating data in a wireless communications network. The apparatus comprises a receiver configured to receive at least one first parameter advertised by a first potential parent relay. The at least one first parameter may comprise a first link life parameter. The first link life parameter may comprise an indication of a last time that the first potential parent relay was in contact with an access point. The apparatus further comprises a processor coupled to the receiver and configured to select the first potential parent relay to relay one or more packets upon receiving the at least one parameter advertised by the first potential parent relay. The receiver may be further configured to receive at least one second parameter advertised by a second potential parent relay. The at least one second parameter may comprise a second link life parameter. The second link life parameter may comprise an indication of a last time that the second potential parent relay was in contact with the access point. The processor may be further configured to deselect the first potential parent relay and select the second potential parent relay to relay one or more other packets if a cost function associated with the second potential parent relay and computed in response to receiving the at least one second parameter is lower than a cost function associated with the first potential parent relay and computed in response to receiving the at least one first parameter.

DETAILED DESCRIPTION

Figure 1:
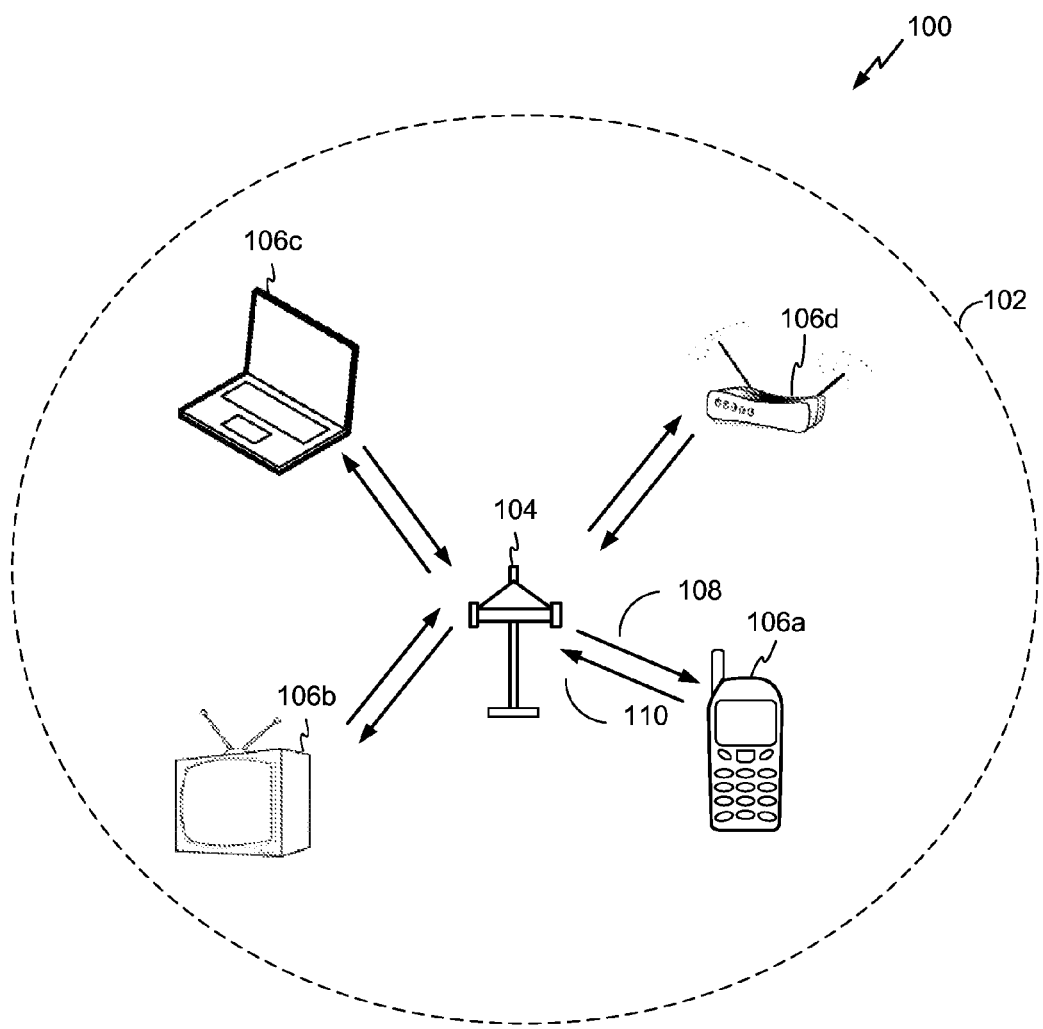
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol or the 802.11ac protocol using orthogonal frequency-division multiplexing (OFDM), direct-sequence spread spectrum (DSSS) communications, a combination of OFDM and DSSS communications, or other schemes. Implementations of the 802.11ah protocol or the 802.11ac protocol may be used for sensors, metering, and smart grid networks. Advantageously, aspects of certain devices implementing the 802.11ah protocol or the 802.11ac protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah or 802.11ac) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard or the 802.11ac standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example the 802.11ah standard or the 802.11ac standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
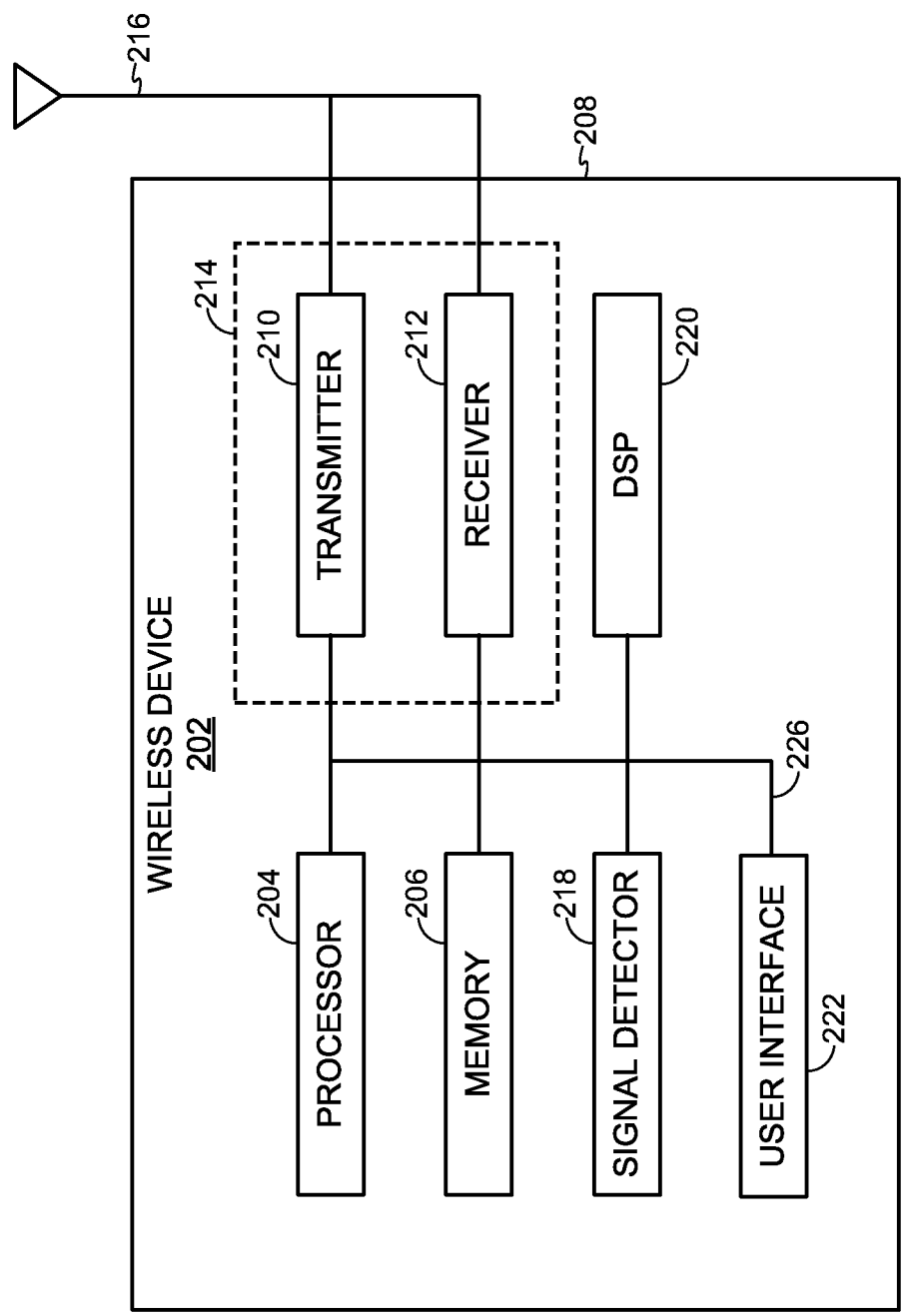
FIG. 2 shows a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104, one of the STAs 106, or one of the relays 320, 322a, and/or 322b.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104, an STA 106, a relay 320, a relay 322a, and/or a relay 322b, and may be used to transmit and/or receive communications. That is, either AP 104, STA 106, relay 320, relay 322a, or relay 322b may serve as transmitter or receiver devices. Certain aspects contemplate signal detector 218 being used by software running on memory 206 and processor 204 to detect the presence of a transmitter or receiver.

As described above, AP 104 and STA 106 may be configured to communicate with each other. However, in some embodiments, AP 104 and STA 106 may not be able to communicate properly with each other. For example, AP 104 and STA 106 may be able to communicate with each other, but at a lower than desired data rate. This may be due to interference or the distance between the AP 104 and the STA 106. In another example, AP 104 and/or STA 106 may be out of a transmit range of the other such that AP 104 and STA 106 cannot communicate with each other.

Adverse consequences may result if the AP 104 and the STA 106 have a poor connection and/or cannot communicate with each other. For example, if the STA 106 can no longer communicate with the AP 104 to which it is associated, a user of the STA 106 may no longer have access to the services (e.g., Internet access, cell phone service, etc.) provided by or through the AP 104.

To establish a stronger connection between the AP 104 and the STA 106 so that each device can communicate with each other, another device, such as a relay, may be utilized. The relay may form a bridge between the AP 104 and the STA 106, thus serving as an intermediary device that allows the AP 104 and the STA 106 to communicate properly with each other (e.g., communicate at a desired data rate). However, a device chosen by the AP 104 or STA 106 to serve as a relay may suffer from the same problems as the AP 104 and/or STA 106. For example, the relay, while having a stronger connection with the AP 104 than the STA 106 (e.g., the relay can communicate with the AP 104 at a higher data rate than the STA 106), may still only be able to communicate with the AP 104 at a lower than desired data rate. In another example, the relay, while at one point being able to communicate with the AP 104 and/or STA 106, may no longer be able to do so.

Thus, a multi-hop relay network may be introduced to ensure that the STA 106 and the AP 104 can communicate with each other. In a multi-hop relay network, two or more relay devices may form a bridge between the AP 104 and the STA 106. For example, the STA 106 may select a first device to serve as a first relay that relays packets to and from the STA 106. The first device may in turn select a second device to serve as a second relay that relays packets to and from the first device. The second device may then select a third device to serve as a third relay that relays packets to and from the second device. Alternatively, if the second device and the AP 104 can communicate at a desired data rate, the second device may instead communicate directly with the AP 104. Thus, the STA 106 and the AP 104 may communicate with each other indirectly at a desired data rate. Multi-hop relay networks are described in greater detail herein with respect to FIG. 3.

Figure 3:
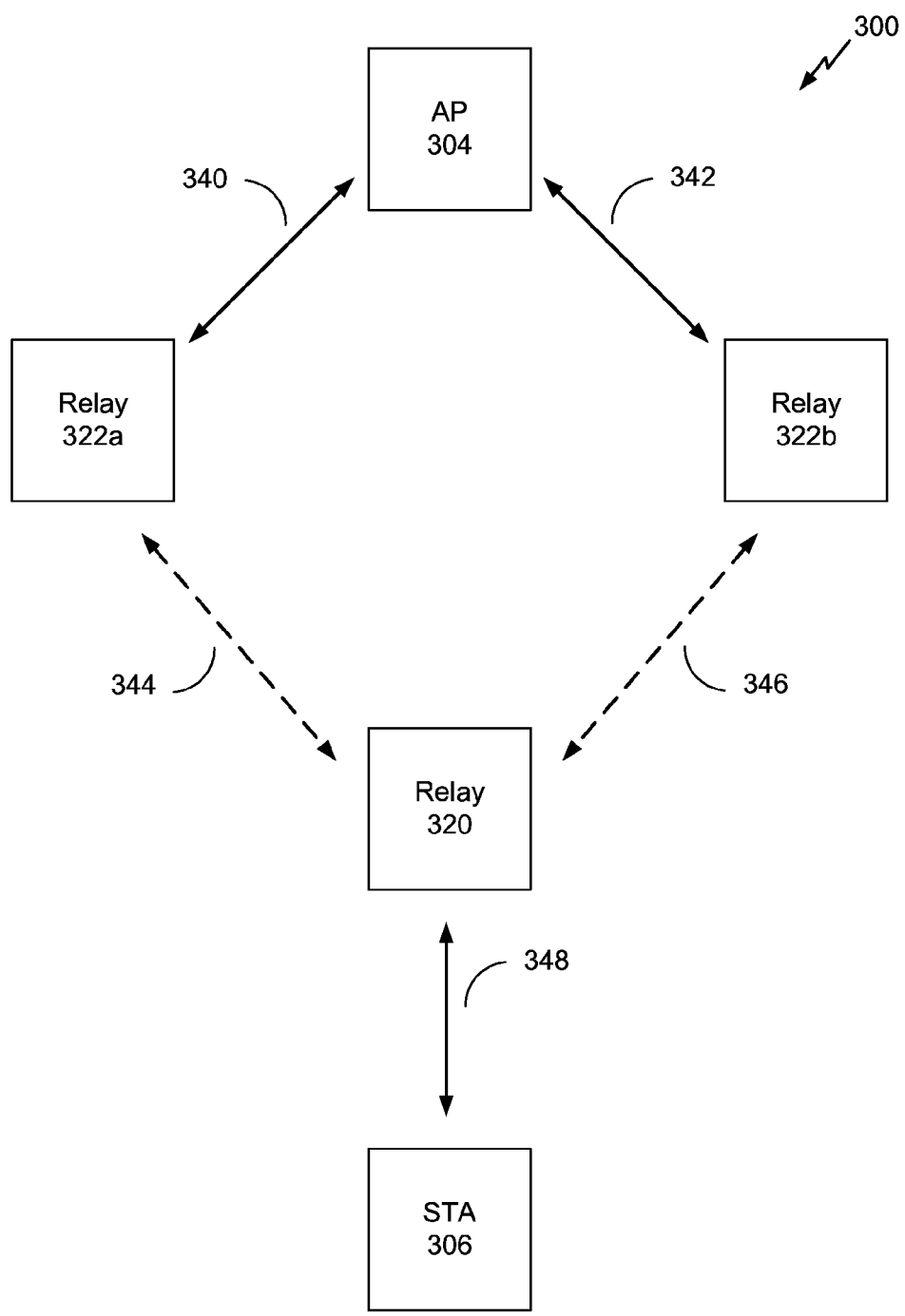
FIG. 3 illustrates a wireless communications system comprising an access point, a station, and a plurality of relays.

FIG. 3 illustrates a wireless communications system 300 comprising an AP 304, a STA 306, a relay 320, a relay 322a, and a relay 322b. While only one STA 306 and only three relays 320 and 322a-b are illustrated, the wireless communications system 300 may comprise any number of STAs and relays. In some embodiments, the AP 304 and the STA 306 can communicate with each other. However, the AP 304 and the STA 306 may have a poor connection. For example, the physical data rate may be limited to the lowest modulation and coding schemes (MCS). In other embodiments, the AP 304 and the STA 306 cannot communicate with each other.

In certain aspects, if the AP 304 and the STA 306 have a poor connection or cannot communicate, relays, such as the relay 320 and one of the relays 322a and 322b, may be set up to facilitate communication between the AP 304 and the STA 306. The relays 320, 322a, and 322b, and any other relays in the wireless communications system 300, may be organized in a hierarchical manner such that a chain of relays is formed from the STA 306 to the AP 304. As an example, the relays may be organized in a tree structure with the AP 304 as the root. The STA 306 may select a relay that it will communicate with (e.g., a first parent relay), the first parent relay may select a relay that it will communicate with (e.g., a second parent relay), and so on until a parent relay is able to communicate with the AP 304. As used herein, a relay or AP 304 is a "parent" of another relay or the STA 306 if the relay or AP 304 is in communication with the another relay or the STA 306 and reaches the AP 304 in one fewer hop (e.g., the another relay reaches the AP 304 in four hops and the parent relay reaches the AP 304 in three hops). Likewise, as used herein, a relay or STA 306 is a "child" of another relay or AP 304 if it is in communication with the another relay or the AP 304 and reaches the AP 304 in one additional hop (e.g., the another relay reaches the AP 304 in four hops and the child relay reaches the AP 304 in five hops).

As illustrated in FIG. 3, if the relay 320 selects the relay 322a as the parent relay, then the STA 306 may communicate with the AP 304 via UL/DL transmission 348, 344, and 340. If the relay 320 selects the relay 322b as the parent relay, then the STA 306 may communicate with the AP 304 via UL/DL transmission 348, 346, and 342.

Before the relays 320 and 322a-b may facilitate communication between the AP 304 and the STA 306, the relays 320 and 322a-b may register or associate with the AP 304. During the association, the relays 320 and 322a-b may inform the AP 304 of their respective capabilities in, for example, a capabilities information field. The capabilities of the relays 320 and 322a-b may include a maximum number of STAs they support, whether it is a relay for uplink traffic, downlink traffic, or both, or other relevant information for an AP 304 to determine whether it should consider the relays 320 and 322a-b as suitable relays when it receives a probe request or request for relay connection from a STA.

In some embodiments, after association is complete, each relay 320 and 322a-b may begin advertising metrics in the form of a set of parameters or variables. Because there may be numerous relays present in the wireless communications system 300, the STA 306 or a given relay may be able to select a parent relay from a plurality of relays. The set of parameters may assist the STA 306 or the given relay in selecting the most appropriate parent relay. For example, the set of parameters may correspond to one or more measures that the STA 306 and/or other relays consider in their decision to select a parent relay.

In some aspects, the parent relay may be the AP 304. In some embodiments, the AP 304 may advertise metrics as described herein. In other embodiments, the AP 304 may not advertise any metrics. Instead, the AP 304 may periodically transmit messages and a relay or STA 306 may derive metrics based on these transmitted messages (e.g., a link quality between the AP 304 and the relay or STA 306).

In an embodiment, the set of parameters may be grouped into two main categories: latency parameters and link life parameters. While two main categories of parameters are described herein, this is not meant to be limiting as any number of categories of parameters and any combination of parameters may be used to facilitate the selection of the parent relay.

Latency parameters may include a link quality between a potential parent relay and the AP 304, a number of hops from the potential parent relay to the AP 304, a packet delivery delay of a potential parent relay, and the like. As an example, the link quality between a potential parent relay and the AP 304 may be computed based on the total collisions in the link and may represent a probability of collision. Furthermore, the number of hops from the potential parent relay to the AP 304 may include an amount of delay. Moreover, the packet delivery delay may be computed by taking the sum of the inverse of the link rates of the path and may represent a time it takes for the potential parent relay to transmit a packet to the AP 304 given that there are no other packets in the wireless communications system 300. By taking into account packet delivery delay, delay propagation in the wireless communications system 300 may be reduced.

Link life parameters may include a battery life of the potential parent relay and a most recent time that a potential parent relay was in contact with the AP 304. As an example, if the battery power level of a potential parent relay is running low, the potential parent relay may set a battery life value such that the potential parent relay prevents potential child relays from connecting with it. In this way, the potential parent relay may preserve more power.

In addition, the most recent time that a potential parent relay was in contact with the AP 304 may be represented in several forms. For example, the most recent time that the potential parent relay was in contact with the AP 304 may be represented by a timestamp. The timestamp may be an indicator of latency and link life. For example, the timestamp may represent the time at which a packet from the AP 304 was last seen by the potential parent relay. If the time represented by the timestamp was a long time ago, it may indicate a larger delay between the AP 304 and the potential parent relay and/or that the link between the potential parent relay and the AP 304 is broken. As another example, the most recent time that the potential parent relay was in contact with the AP 304 may be represented by a difference in time between a timestamp of the last packet received from the AP 304. As a further example, the most recent time that the potential parent relay was in contact with the AP 304 may be represented by a user-defined value.

Link life parameters may also include other parameters. For example, link life parameters may include a duration of time left until the potential parent relay expects to be disconnected from the AP 304 (e.g., determined based on a number and/or time of previous disconnects), a duration of time that the potential parent relay expects to stay associated with the AP 304, and/or a duration of time left until the potential parent relay expects to reconfigure (e.g., a duration of time left until the potential parent relay expects to change its parent relay). Relay reconfiguration may not be reliable and/or may cause additional latency, and thus the duration of time left until the potential parent relay expects to reconfigure may be an important consideration for a STA or relay in choosing a parent relay.

A STA 306 or relay that is looking to select a parent relay may determine the selection based on an analysis of one or more of the latency parameters, one or more of the link life parameters, or a combination of one or more of the latency parameters and one or more of the link life parameters. As illustrated in FIG. 3, relay 322a may be in communication with the AP 304 via UL/DL transmission 340. Likewise, relay 322b may be in communication with the AP 304 via UL/DL transmission 342. Relay 320 may select relay 322a or relay 322b as a parent relay. As an example, the relay 320 may analyze one or more latency parameters in making the parent relay selection. However, since both relays 322a and 322b have the same number of hops to the AP 304 (e.g., one hop), the relay 320 may analyze other latency parameters, such as the packet delivery delay, in making the selection. As another example, the relay 320 may select relay 322a or relay 322b based on a link life parameter, such as a link life parameter that indicates which of relays 322a and 322b has the most available battery life. As yet another example, the relay 320 may select relay 322a or relay 322b based on which relay 322a or 322b minimizes a cost function, where the cost function takes into account one or more latency and/or link life parameters.

In some embodiments, the STA 306 or relay that is looking to select a parent relay may perform additional analysis before selecting a relay to be a parent relay. In some aspects, each relay may include a routing table. The routing table may contain the media access control (MAC) address of each of the relay's children. The STA 306 or relay that is looking to select a parent relay may compare the MAC address of a potential parent relay with the MAC addresses in its routing table. If the MAC address of the potential parent relay matches any of the MAC addresses in the routing table, then the STA 306 or relay that is looking to select a parent relay may not select the potential parent relay. In this way, loops in the wireless communications system 300 may be avoided because the STA 306 or relay that is looking to select a parent relay is prevented from choosing an existing child relay as a parent relay.

In an embodiment, the parameters used and/or how the parameters are manipulated to determine which relay should be the parent relay may be updated over time. For example, initially the cost function may be based on the packet delivery delay and the last seen AP timestamp. However, the characteristics of the relay 320 may change such that battery life becomes more important and delay becomes less important. Accordingly, the cost function may change such that it is later based on the battery life of a potential parent relay and the last seen AP timestamp.

In an embodiment, the set of parameters may be advertised in a beacon message transmitted by the respective relay 320, 322a, or 322b or upon request in a probe response. The beacon message may be similar to a beacon message that is normally transmitted by the AP 304 to broadcast its service set identification (SSID) and capabilities. However, the beacon message may also include an additional information element (IE) that includes the set of parameters. In this way, a new message does not need to be defined to provide information that the STA 306 and/or other relays use in selecting a parent relay. This may lead to fewer collisions and reduce the medium occupancy as fewer messages may be transmitted over the wireless communications system 300.

In some embodiments, a relay or STA 306 may select a parent relay as described herein immediately after receiving a first beacon message comprising the set of parameters. In other embodiments, a relay or STA 306 may select a parent relay after waiting a predetermined period of time so as to allow the relay or STA 306 to receive one or more beacon messages from one or more potential parent relays.

In an embodiment, the parent relay selection may be updated periodically. For example, even after a parent relay has been selected, the child relay may continue to analyze the sets of parameters received via the beacon messages. If the set of parameters change, additional relays become associated with the AP 304, relays become disassociated with the AP 304, relays move out of range of the child relay, and/or the selected parent relay is no longer operational, such that the selected parent relay is no longer the most appropriate parent relay, the child relay may deselect the selected parent relay and select another relay as the parent relay. In some aspects, the child relay may wait a predetermined amount of time after selecting one parent relay before performing an analysis to determine whether selecting another parent relay is appropriate (e.g., another parent relay results in a lower cost function).

In some embodiments, if a child relay (e.g., relay 320) updates its parent relay, the paths of the child relays of the relay 320 (e.g., STA 306) may be updated such that the paths of the child relays also include the newly selected parent relay.

In some embodiments, relay 320, 322a, or 322b may stop advertising the set of parameters in a beacon message if the given relay 320, 322a, or 322b is disconnected from its parent relay (e.g., the communication link between the given relay 320, 322a, or 322b and the AP 304 is broken). The given relay 320, 322a, or 322b may begin advertising the set of parameters in a beacon message again, however, if the given relay 320, 322a, or 322b successfully associates with its parent relay or another relay (e.g., if the communication link between the given relay 320, 322a, or 322b and the AP 304 is reestablished).

In an embodiment, because each relay and/or STA 306 receives raw parameters from potential parent relays via the beacon messages rather than pre-computed cost functions, each relay and/or STA 306 may compute its own, independent cost function. For example, STA 306 may consider different parameters in determining which relay to select as a parent relay than the relay 320 may consider. In this way, each relay and/or STA 306 within the same wireless communications system 300 may be able to independently determine and optimize the communication path from STA 306 to AP 304.

Figure 4:
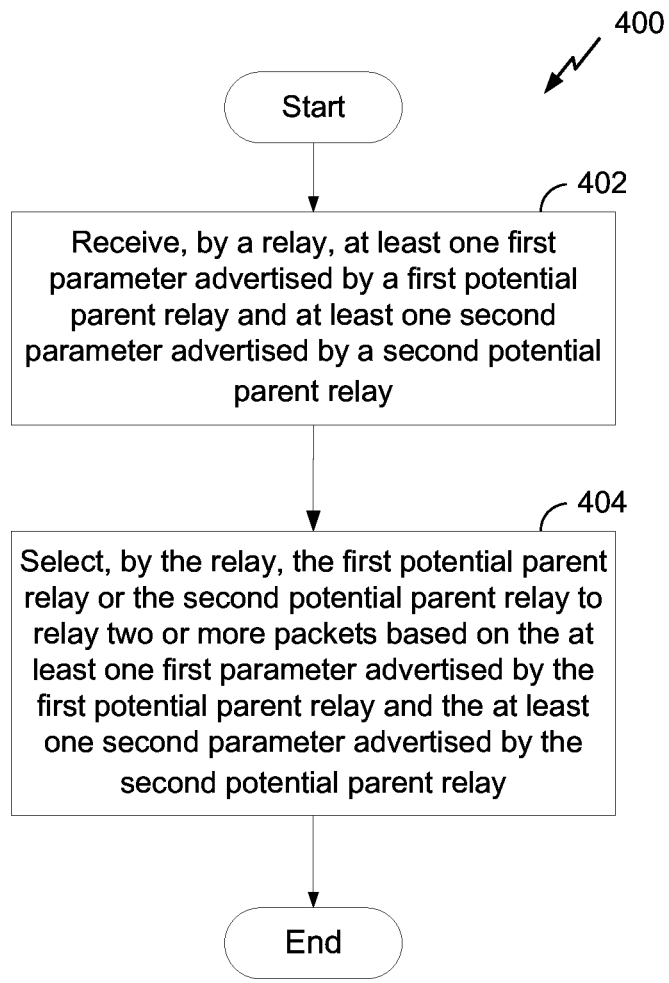
FIG. 4 is a flowchart of a process for selecting a parent relay in the wireless communications system of FIGS. 1 and 3.

FIG. 4 is a flowchart of a process 400 for selecting a parent relay in the wireless communications system of FIGS. 1 and 3. At block 402, the process 400 receives, by a relay, at least one first parameter advertised by a first potential parent relay and at least one second parameter advertised by a second potential parent relay. In an embodiment, the at least one first parameter advertised by the first potential parent relay and/or the at least one second parameter advertised by the second potential parent relay comprise at least one latency parameter and/or at least one link life parameter. At block 404, the process 400 selects, by the relay, the first potential parent relay or the second potential parent relay to relay two or more packets based on the at least one first parameter advertised by the first potential parent relay and the at least one second parameter advertised by the second potential parent relay. After block 404, the process 400 ends.

Figure 5:
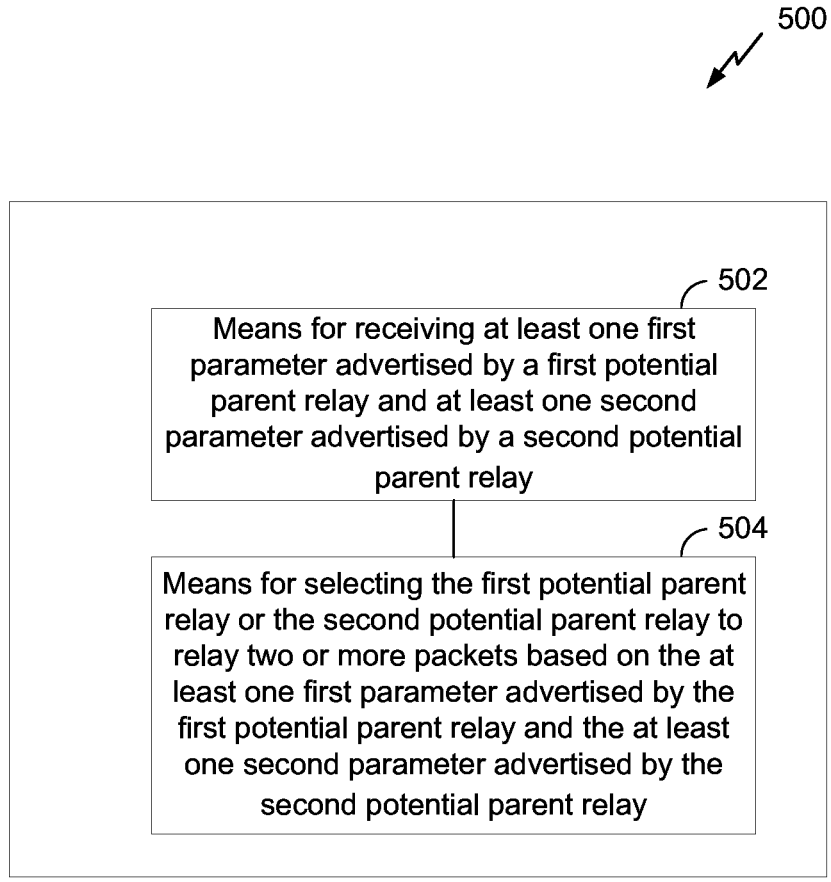
FIG. 5 is a functional block diagram of an exemplary device that may be employed within the wireless communication system of FIGS. 1 and 3.

FIG. 5 is a functional block diagram of an exemplary device 500 that may be employed within the wireless communications systems 100 and 300. The device 500 includes means 502 for receiving at least one first parameter advertised by a first potential parent relay and at least one second parameter advertised by a second potential parent relay. In an embodiment, means 502 for receiving at least one first parameter advertised by a first potential parent relay and at least one second parameter advertised by a second potential parent relay may be configured to perform one or more of the functions discussed above with respect to block 402. The device 500 further includes means 504 for selecting the first potential parent relay or the second potential parent relay to relay two or more packets based on the at least one first parameter advertised by the first potential parent relay and the at least one second parameter advertised by the second potential parent relay. In an embodiment, means 504 for selecting the first potential parent relay or the second potential parent relay to relay two or more packets based on the at least one first parameter advertised by the first potential parent relay and the at least one second parameter advertised by the second potential parent relay may be configured to perform one or more of the functions discussed above with respect to block 404.

Figure 6:
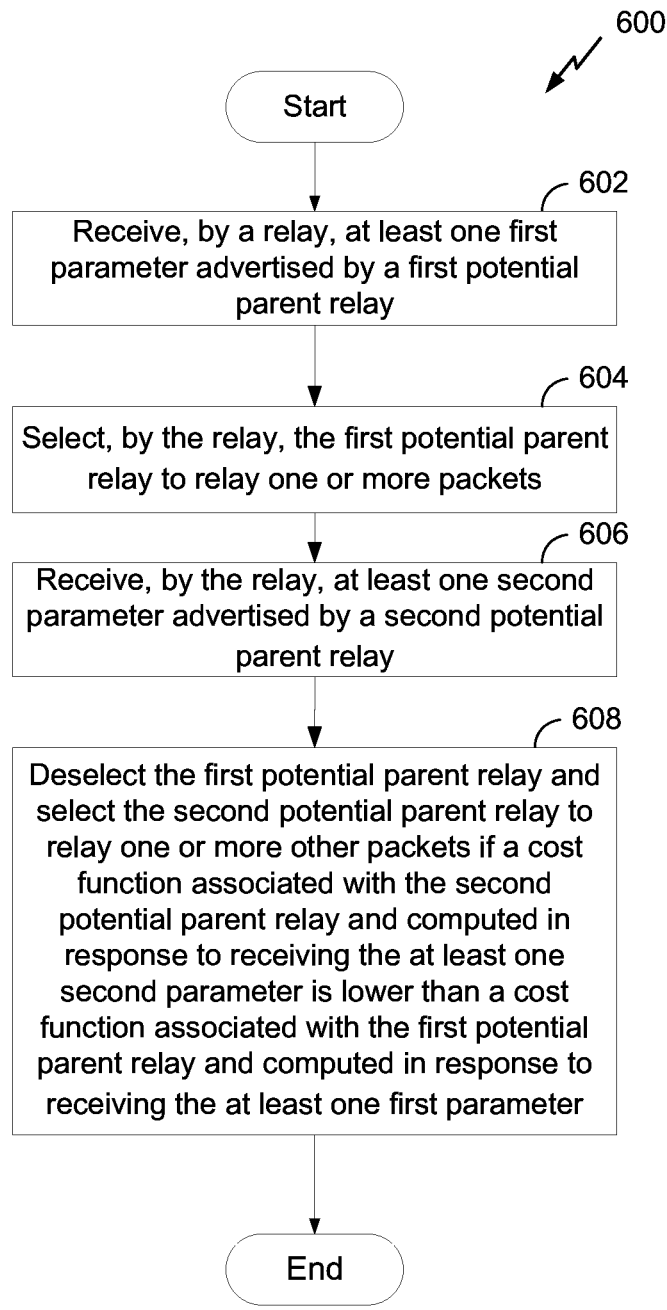
FIG. 6 is a flowchart of another process for selecting a parent relay in the wireless communications system of FIGS. 1 and 3.

FIG. 6 is a flowchart of a process 600 for selecting a parent relay in the wireless communications system of FIGS. 1 and 3. At block 602, the process 600 receives, by a relay, at least one first parameter advertised by a first potential parent relay. In an embodiment, the at least one first parameter comprises at least one latency parameter and/or at least one life link parameter. At block 604, the process 600 selects, by the relay, the first potential parent relay to relay one or more packets. At block 606, the process 600 receives, by the relay, at least one second parameter advertised by a second potential parent relay. In an embodiment, the at least one second parameter comprises at least one latency parameter and/or at least one life link parameter. At block 608, the process 600 deselects the first potential parent relay and selects the second potential parent relay to relay one or more other packets if a cost function associated with the second potential parent relay and computed in response to receiving the at least one second parameter is lower than a cost function associated with the first potential parent relay and computed in response to receiving the at least one first parameter. After block 608, the process 600 ends.

Figure 7:
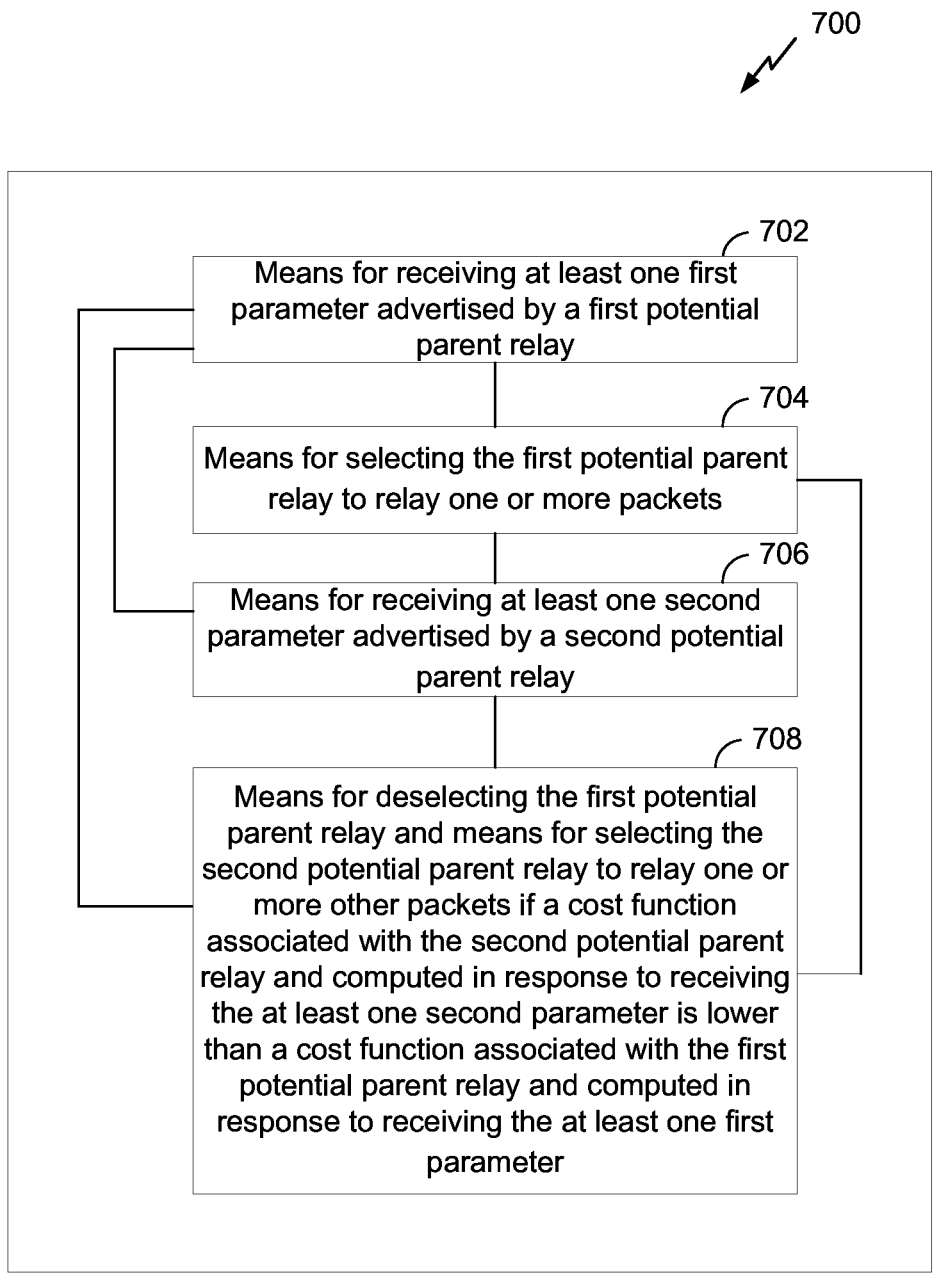
FIG. 7 is another functional block diagram of an exemplary device that may be employed within the wireless communication system of FIGS. 1 and 3.

FIG. 7 is a functional block diagram of an exemplary device 700 that may be employed within the wireless communications systems 100 and 300. The device 700 includes means 702 for receiving at least one first parameter advertised by a first potential parent relay. In an embodiment, means 702 for receiving at least one first parameter advertised by a first potential parent relay may be configured to perform one or more of the functions discussed above with respect to block 602. The device 700 further includes means 704 for selecting the first potential parent relay to relay one or more packets. In an embodiment, means 704 for selecting the first potential parent relay to relay one or more packets may be configured to perform one or more of the functions discussed above with respect to block 604. The device 700 further includes means 706 for receiving at least one second parameter advertised by a second potential parent relay. In an embodiment, means 706 for receiving at least one second parameter advertised by a second potential parent relay may be configured to perform one or more of the functions discussed above with respect to block 606. The devices 700 further include means 708 for deselecting the first potential parent relay and means for selecting the second potential parent relay to relay one or more other packets if a cost function associated with the second potential parent relay and computed in response to receiving the at least one second parameter is lower than a cost function associated with the first potential parent relay and computed in response to receiving the at least one first parameter. In an embodiment, means 708 for deselecting the first potential parent relay and means for selecting the second potential parent relay to relay one or more other packets if a cost function associated with the second potential parent relay and computed in response to receiving the at least one second parameter is lower than a cost function associated with the first potential parent relay and computed in response to receiving the at least one first parameter may be configured to perform one or more of the functions discussed above with respect to block 608.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for communicating data in a wireless communications network, comprising:
    a receiver configured to receive at least one first parameter advertised by a first potential parent relay and at least one second parameter advertised by a second potential parent relay, wherein the at least one first parameter comprises a first link life parameter, wherein the first link life parameter comprises at least one of (i) a first timestamp of a last time that the first potential parent relay was in contact with an access point or (ii) a difference in time since the first timestamp, wherein the at least one second parameter comprises a second link life parameter, and wherein the second link life parameter comprises at least one of (i) a second timestamp of a last time that the second potential parent relay was in contact with the access point or (ii) a difference in time since the second timestamp; and
    a processor coupled to the receiver and configured to:
        compare an address of the first potential parent relay and an address of the second potential parent relay to addresses stored in a routing table of the apparatus, wherein the routing table stores addresses for each child relay of the apparatus, and
        select the first potential parent relay or the second potential parent relay to relay two or more packets based on the at least one first parameter advertised by the first potential parent relay and the at least one second parameter advertised by the second potential parent relay, wherein the first potential parent relay is not selected if the address of the first potential parent relay matches an address stored in the routing table, and wherein the second potential parent relay is not selected if the address of the second potential parent relay matches an address stored in the routing table.

2. The apparatus of claim 1, wherein the processor is configured to select the first potential parent relay or the second potential parent relay based on a first latency parameter advertised by the first potential parent relay and a second latency parameter advertised by the second potential parent relay.

3. The apparatus of claim 2, wherein the first latency parameter comprises at least one of a link quality between the first potential parent relay and the access point, a number of hops from the first potential parent relay to the access point, or a time the first potential parent relay takes to transmit a packet to the access point, and wherein the second latency parameter comprises at least one of a link quality between the second potential parent relay and the access point, a number of hops from the second potential parent relay to the access point, or a time the second potential parent relay takes to transmit a packet to the access point.

4. The apparatus of claim 1, wherein the first link life parameter further comprises a battery life of the first potential parent relay and the first timestamp comprising a most recent time that a packet was received by the first potential parent relay from the access point, and wherein the second link life parameter further comprises a battery life of the second potential parent relay and the second timestamp comprising a most recent time that a packet was received by the second potential parent relay from the access point.

5. The apparatus of claim 1, wherein the processor is further configured to compute a first cost function and a second cost function, wherein the first cost function is associated with the first potential parent relay and is computed based on the at least one first parameter advertised by the first potential parent relay, and wherein the second cost function is associated with the second potential parent relay and is computed based on the at least one second parameter advertised by the second potential parent relay.

6. The apparatus of claim 5, wherein the processor is configured to select the first potential parent relay or the second potential parent relay based on which potential parent relay is associated with a lower cost function.

7. The apparatus of claim 5, wherein the first cost function is computed based on a first latency parameter and the at least one first parameter, and wherein the second cost function is computed based on a second latency parameter and the at least one second parameter.

8. The apparatus of claim 1, wherein the first potential parent relay is configured to advertise the at least one first parameter after associating with the access point and the second potential parent relay is configured to advertise the at least one second parameter after associating with the access point.

9. The apparatus of claim 8, wherein the first potential parent relay is configured to advertise the at least one first parameter when a probe response is received, and wherein the second potential parent relay is configured to advertise the at least one second parameter when a probe response is received.

10. The apparatus of claim 1, wherein the processor is further configured to compare a media access control (MAC) address of the first potential parent relay and a MAC address of the second potential parent relay to MAC addresses stored in the routing table of the apparatus.

11. The apparatus of claim 10, wherein the processor is further configured not to select the first potential parent relay if the MAC address of the first potential parent relay matches a MAC address stored in the routing table, and wherein the processor is further configured not to select the second potential parent relay if the MAC address of the second potential parent relay matches a MAC address stored in the routing table.

12. A method for communicating data in a wireless communications network, comprising:
    receiving, by a relay, at least one first parameter advertised by a first potential parent relay and at least one second parameter advertised by a second potential parent relay, wherein the at least one first parameter comprises a first link life parameter, wherein the first link life parameter comprises at least one of (i) a first timestamp of a last time that the first potential parent relay was in contact with an access point or (ii) a difference in time since the first timestamp, wherein the at least one second parameter comprises a second link life parameter, and wherein the second link life parameter comprises at least one of (i) a second timestamp of a last time that the second potential parent relay was in contact with the access point or (ii) a difference in time since the second timestamp;

comparing, by the relay, an address of the first potential parent relay and an address of the second potential parent relay to addresses stored in a routing table of the relay, wherein the routing table stores addresses for each child relay of the relay;

selecting, by the relay, the first potential parent relay or the second potential parent relay to relay two or more packets based on the at least one first parameter advertised by the first potential parent relay and the at least one second parameter advertised by the second potential parent relay, wherein the first potential parent relay is not selected if the address of the first potential parent relay matches an address stored in the routing table, and wherein the second potential parent relay is not selected if the address of the second potential parent relay matches an address stored in the routing table.

13. The method of claim 12, wherein selecting the first potential parent relay or the second potential parent relay comprises selecting the first potential parent relay or the second potential parent relay based on a first latency parameter advertised by the first potential parent relay and a second latency parameter advertised by the second potential parent relay.

14. The method of claim 13, wherein the first latency parameter comprises at least one of a link quality between the first potential parent relay and the access point, a number of hops from the first potential parent relay to the access point, or a time the first potential parent relay takes to transmit a packet to the access point, and wherein the second latency parameter comprises at least one of a link quality between the second potential parent relay and the access point, a number of hops from the second potential parent relay to the access point, or a time the second potential parent relay takes to transmit a packet to the access point.

15. The method of claim 12, wherein the first link life parameter further comprises a battery life of the first potential parent relay and the first timestamp comprising a most recent time that a packet was received by the first potential parent relay from the access point, and wherein the second link life parameter further comprises a battery life of the second potential parent relay and the second timestamp comprising a most recent time that a packet was received by the second potential parent relay from the access point.

16. The method of claim 12, further comprising computing, by the relay, a first cost function and a second cost function, wherein the first cost function is associated with the first potential parent relay and is computed based on the at least one first parameter advertised by the first potential parent relay, and wherein the second cost function is associated with the second potential parent relay and is computed based on the at least one second parameter advertised by the second potential parent relay.

17. The method of claim 16, wherein selecting the first potential parent relay or the second potential parent relay comprises selecting the first potential parent relay or the second potential parent relay based on which potential parent relay is associated with a lower cost function.

18. The method of claim 16, wherein computing the first cost function and the second cost function comprises:
computing the first cost function based on a first latency parameter and the at least one first parameter; and
computing the second cost function based on a second latency parameter and the at least one second parameter.

19. The method of claim 12, wherein receiving the at least one first parameter advertised by a first potential parent relay and the at least one second parameter advertised by a second potential parent relay comprises receiving the at least one first parameter advertised by the first potential parent relay after the first potential parent relay associates with the access point and the at least one second parameter advertised by the second potential parent relay after the second potential parent relay associates with the access point.

20. The method of claim 19, wherein receiving the at least one first parameter advertised by the first potential parent relay and the at least one second parameter advertised by the second potential parent relay comprises receiving the at least one first parameter advertised by the first potential parent relay when a probe response is received by the first potential parent relay and the at least one second parameter advertised by the second potential parent relay when a probe response is received by the second potential parent relay.

21. The method of claim 12, wherein the comparing the address of the first potential parent relay and the address of the second potential parent relay further comprises comparing, by the relay, a media access control (MAC) address of the first potential parent relay and a MAC address of the second potential parent relay to MAC addresses stored in the routing table of the relay.

22. The method of claim 21, further comprising:
not selecting, by the relay, the first potential parent relay if the MAC address of the first potential parent relay matches a MAC address stored in the routing table; and
not selecting, by the relay, the second potential parent relay if the MAC address of the second potential parent relay matches a MAC address stored in the routing table.

23. An apparatus for communicating data in a wireless communications network, comprising:
means for receiving at least one first parameter advertised by a first potential parent relay and at least one second parameter advertised by a second potential parent relay, wherein the at least one first parameter comprises a first link life parameter, wherein the first link life parameter comprises at least one of (i) a first timestamp of a last time that the first potential parent relay was in contact with an access point or (ii) a difference in time since the first timestamp, wherein the at least one second parameter comprises a second link life parameter, and wherein the second link life parameter comprises at least one of (i) a second timestamp of a last time that the second potential parent relay was in contact with the access point or (ii) a difference in time since the second timestamp;
means for comparing an address of the first potential parent relay and an address of the second potential parent relay to addresses stored in a routing table of the apparatus, wherein the routing table stores addresses for each child relay of the apparatus;
means for selecting the first potential parent relay or the second potential parent relay to relay two or more packets based on the at least one first parameter advertised by the first potential parent relay and the at least one second parameter advertised by the second potential parent relay, wherein the first potential parent relay is not selected if the address of the first potential parent relay matches an address stored in the routing table, and wherein the second potential parent relay is not selected if the address of the second potential parent relay matches an address stored in the routing table.

24. The apparatus of claim 23, wherein means for selecting the first potential parent relay or the second potential parent relay comprises means for selecting the first potential parent relay or the second potential parent relay based on a first latency parameter advertised by the first potential parent relay and a second latency parameter advertised by the second potential parent relay.

25. The apparatus of claim 24, wherein the first latency parameter comprises at least one of a link quality between the first potential parent relay and the access point, a number of hops from the first potential parent relay to the access point, or a time the first potential parent relay takes to transmit a packet to the access point, and wherein the second latency parameter comprises at least one of a link quality between the second potential parent relay and the access point, a number of hops from the second potential parent relay to the access point, or a time the second potential parent relay takes to transmit a packet to the access point.

26. The apparatus of claim 23, wherein the first link life parameter further comprises a battery life of the first potential parent relay and the first timestamp comprising a most recent time that a packet was received by the first potential parent relay from the access point, and wherein the second link life parameter further comprises a battery life of the second potential parent relay and the second timestamp comprising a most recent time that a packet was received by the second potential parent relay from the access point.

27. The apparatus of claim 23, further comprising means for computing a first cost function and a second cost function, wherein the first cost function is associated with the first potential parent relay and is computed based on the at least one first parameter advertised by the first potential parent relay, and wherein the second cost function is associated with the second potential parent relay and is computed based on the at least one second parameter in the second potential parent relay.

28. The apparatus of claim 27, wherein means for selecting the first potential parent relay or the second potential parent relay comprises selecting the first potential parent relay or the second potential parent relay based on which potential parent relay is associated with a lower cost function.

29. The apparatus of claim 27, wherein means for computing the first cost function and the second cost function comprises:
means for computing the first cost function based on a first latency parameter and the at least one first parameter; and
means for computing the second cost function based on a second latency parameter and the at least one second parameter.

30. The apparatus of claim 23, wherein the means for receiving the at least one first parameter advertised by the first potential parent relay and the at least one second parameter advertised by the second potential parent relay comprises means for receiving the at least one first parameter advertised by a first potential parent relay after the first potential parent relay associates with the access point and the at least one second parameter advertised by a second potential parent relay after the second potential parent relay associates with the access point.

31. The apparatus of claim 30, wherein the means for receiving the at least one first parameter advertised by the first potential parent relay and the at least one second parameter advertised by the second potential parent relay comprises means for receiving the at least one first parameter advertised by a first potential parent relay when a probe response is received by the first potential parent relay and the at least one second parameter advertised by a second potential parent relay when a probe response is received by the second potential parent relay.

32. The apparatus of claim 23, wherein the means for comparing further comprises means for comparing a media access control (MAC) address of the first potential parent relay and a MAC address of the second potential parent relay to MAC addresses stored in the routing table of the apparatus.

33. The apparatus of claim 32, further comprising:
means for not selecting the first potential parent relay if the MAC address of the first potential parent relay matches a MAC address stored in the routing table; and
means for not selecting the second potential parent relay if the MAC address of the second potential parent relay matches a MAC address stored in the routing table.

34. The apparatus of claim 23, wherein the means for receiving comprises a receiver of a relay, and wherein the means for selecting comprises a processor of the relay.

35. A non-transitory computer-readable medium comprising code that, when executed, causes an apparatus to:
receive at least one first parameter advertised by a first potential parent relay and at least one second parameter advertised by a second potential parent relay, wherein the at least one first parameter comprises a first link life parameter, wherein the first link life parameter comprises at least one of (i) a first timestamp of a last time that the first potential parent relay was in contact with an access point or (ii) a difference in time since the first timestamp, wherein the at least one second parameter comprises a second link life parameter, and wherein the second link life parameter comprises at least one of (i) a second timestamp of a last time that the second potential parent relay was in contact with the access point or (ii) a difference in time since the second timestamp;
compare an address of the first potential parent relay and an address of the second potential parent relay to addresses stored in a routing table of the apparatus, wherein the routing table stores addresses for each child relay of the apparatus; and
select the first potential parent relay or the second potential parent relay to relay two or more packets based on the at least one first parameter advertised by the first potential parent relay and the at least one second parameter advertised by the second potential parent relay, wherein the first potential parent relay is not selected if the address of the first potential parent relay matches an address stored in the routing table, and wherein the second potential parent relay is not selected if the address of the second potential parent relay matches an address stored in the routing table.

36. The non-transitory computer-readable medium of claim 35, further comprising code that, when executed causes the apparatus to select the first potential parent relay or the second potential parent relay based on a first latency parameter advertised by the first potential parent relay and a second latency parameter advertised by the second potential parent relay.

37. The non-transitory computer-readable medium of claim 36, wherein the first latency parameter comprises at least one of a link quality between the first potential parent relay and the access point, a number of hops from the first potential parent relay to the access point, or a time the first potential parent relay takes to transmit a packet to the access point, and wherein the second latency parameter comprises at least one of a link quality between the second potential parent relay and the access point, a number of hops from the second potential parent relay to the access point, or a time the second potential parent relay takes to transmit a packet to the access point.

38. The non-transitory computer-readable medium of claim 35, wherein the first link life parameter further comprises a battery life of the first potential parent relay and the first timestamp comprising a most recent time that a packet was received by the first potential parent relay from the access point, and wherein the second link life parameter further comprises a battery life of the second potential parent relay and the second timestamp comprising a most recent time that a packet was received by the second potential parent relay from the access point.

39. The non-transitory computer-readable medium of claim 35, further comprising code that, when executed, causes the apparatus to compute a first cost function and a second cost function, wherein the first cost function is associated with the first potential parent relay and is computed based on the at least one first parameter advertised by the first potential parent relay, and wherein the second cost function is associated with the second potential parent relay and is computed based on the at least one second parameter advertised by the second potential parent relay.

40. The non-transitory computer-readable medium of claim 39, further comprising code that, when executed, causes the apparatus to select the first potential parent relay or the second potential parent relay based on which potential parent relay is associated with a lower cost function.

41. The non-transitory computer-readable medium of claim 39, further comprising code that, when executed, causes the apparatus to:
compute the first cost function based on a first latency parameter and the at least one first parameter; and
compute the second cost function based on a second latency parameter and the at least one second parameter.

42. The non-transitory computer-readable medium of claim 35, further comprising code that, when executed, causes the apparatus to:
receive the at least one first parameter advertised by the first potential parent relay after the first potential parent relay associates with the access point; and
receive the at least one second parameter advertised by a second potential parent relay after the second potential parent relay associates with the access point.

43. The non-transitory computer-readable medium of claim 42, further comprising code that, when executed, causes the apparatus to:
receive the at least one first parameter advertised by the first potential parent relay when a probe response is received by the first potential parent relay; and
receive the at least one second parameter advertised by a second potential parent relay when a probe response is received by the second potential parent relay.

44. The non-transitory computer-readable medium of claim 35, further comprising code that, when executed, causes the apparatus to compare a media access control (MAC) address of the first potential parent relay and a MAC address of the second potential parent relay to MAC addresses stored in the routing table of the apparatus.

45. The non-transitory computer-readable medium of claim 44, further comprising code that, when executed, causes the apparatus to:
not select the first potential parent relay if the MAC address of the first potential parent relay matches a MAC address stored in the routing table; and
not select the second potential parent relay if the MAC address of the second potential parent relay matches a MAC address stored in the routing table.

* * * * *